Figure 1:
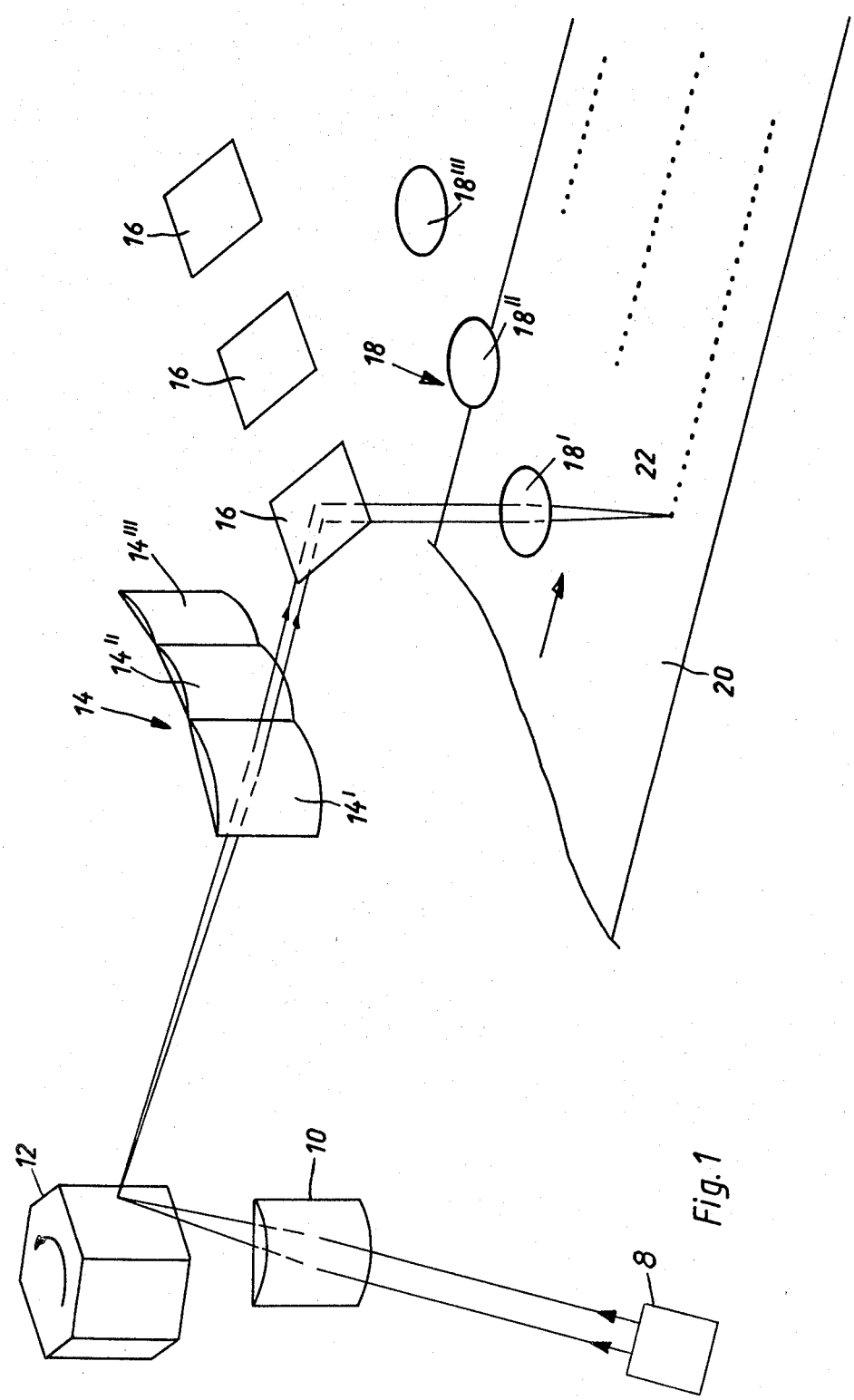

United States Patent [19]

Langhans

[11] 4,378,480
[45] Mar. 29, 1983

[54] DEVICE FOR THE OPTICAL CHOPPING OF A LASER BEAM

[76] Inventor: Lutz Langhans, Kempterstr. 14, 8135 Starnberg-Söcking, Fed. Rep. of Germany

[21] Appl. No.: 227,087
[22] PCT Filed: May 6, 1980
[86] PCT No.: PCT/DE80/00056
 § 371 Date: Jan. 7, 1981
 § 102(e) Date: Jan. 2, 1981
[87] PCT Pub. No.: WO80/02393
 PCT Pub. Date: Nov. 13, 1980

[30] Foreign Application Priority Data

May 7, 1979 [DE] Fed. Rep. of Germany ....... 2918283

[51] Int. Cl.$^3$ ..................... G02B 27/17; B23K 27/00
[52] U.S. Cl. .............................. 219/121 LK; 350/6.8; 350/486; 219/121 LT; 219/121 LW
[58] Field of Search ................. 350/6.6, 6.7, 6.8, 486; 219/121 LK, 121 LL, 121 LS, 121 LT, 121 LW; 346/76 L

[56] References Cited

U.S. PATENT DOCUMENTS 4,131,782 12/1978 Einstein et al. ............... 346/76 L X
4,265,254 5/1981 Koch et al. ............... 219/121 LT X

FOREIGN PATENT DOCUMENTS 1175362 8/1964 Fed. Rep. of Germany .
2250763 5/1973 Fed. Rep. of Germany .
2828754 2/1979 Fed. Rep. of Germany .
2130698 11/1972 France .
2375964 7/1978 France .

OTHER PUBLICATIONS

Grimm; *IBM Technical Disclosure Bulletin*, vol. 14, No. 9, Feb. 1972, pp. 2641 and 2642.
IBM Technical Disclosure Bulletin, vol. 15, No. 2, Jul., 1972, p. 495–5.

*Primary Examiner*—F. L. Evans
*Attorney, Agent, or Firm*—Stephenson and Boller

[57] ABSTRACT

Apparatus for optical chopping of a laser beam into discrete light pulses consisting of a source of laser light, a rotating mirror, a first collecting lens located between the laser source and the rotating mirror, a first system of collecting lenses for receiving light reflected from the mirror, and a second system of collecting lenses which receive light from the first system and direct the light energy in a predetermined pattern on the surface of a substrate such as a moving web of paper to be perforated or divided.

10 Claims, 2 Drawing Figures

DEVICE FOR THE OPTICAL CHOPPING OF A LASER BEAM

BACKGROUND OF THE INVENTION

This invention concerns a device for optical chopping of a laser beam into discrete light pulses incident sequentially and repeatedly on a number of target points.

With the use of lasers for the treatment or machining of substrates, the problem of a simultaneous or nearly simultaneous incidence on the substrate in several target zones often arises. The application of several lasers as a rule is impossible for reasons of cost and space. A division of the beam by a so-called beam splitter is unfavorable because the resulting partial beams have a correspondingly diminished intensity which is not sufficient for certain machining processes and the split beams furthermore exhibit changing and in any case different intensities.

If laser beams are used, e.g. for the perforation of paper, a certain, relatively high and constant intensity of the laser beam performing the perforation must be assured in order to obtain a uniform size and quality of the perforations. In that case, beam splitting would be unfavorable for the reasons mentioned above.

A device for optical chopping of a laser beam is already known in which a continuous laser beam is introduced into an optical mirror system consisting of several consecutive rotating disks exhibiting reflecting and transmitting segments. The system thus generates a large number of light paths formed by the different combination of reflecting and transmitting segments. The beam introduced into the system is guided into the different light paths in steps according to the respective angular position of the disks and in this process, the beam is successively incident on different target points. Such an arrangement makes it possible to provide a paper web passing through the system at high speed with rows of perforations located transverse to the machine direction. The known device has several disadvantages, however. Since only a limited number of perforation combinations find space on the disks, it is not possible to realize an arbitrarily high perforation frequency. Since the beam paths have different lengths, this gives rise to focusing difficulties on the substrate.

This invention provides improved apparatus of the type described above which will furnish the highest chopping frequency, but at the same time is simple in structure and contains only a minimum of moving parts.

SUMMARY OF THE INVENTION

Thus, according to the invention, the laser beam, focused by a first collecting lens, is incident on the rotating mirror and then intermittently sweeps a first lens system consisting of several collecting lenses of equal focal length. The distance of the first lens system to the rotating mirror corresponds to the focal length of the individual lenses. The first system of lenses is followed by a row of focusing lenses, of which each is assigned to one of the lenses of the first system and which focus the parallel light beam on a substrate, for example, a moving paper web. As long as the beam sweeps a lens of the first system, the intensity remains constant in the focus of the respective focusing lens. At the moment when the beam deflected by the rotating mirror reaches the next lens of the first lens system, it jumps to the focal point of the next focusing lens. The full intensity of the original laser beam is available in each focusing point. If a polygonal mirror with a suitably large number of faces and high speed of rotation is used, it is possible to reach frequencies higher than those attainable with known devices, so that when the device is used to perforate cigarette paper, for example, the speed-determining step is the technically realizable paper feed rather than the perforation frequency. A particularly surprising finding in the invention is that only a single rotating part, i.e. the polygonal mirror, is necessary in order to realize the extremely high chopping frequencies.

Figure 2:
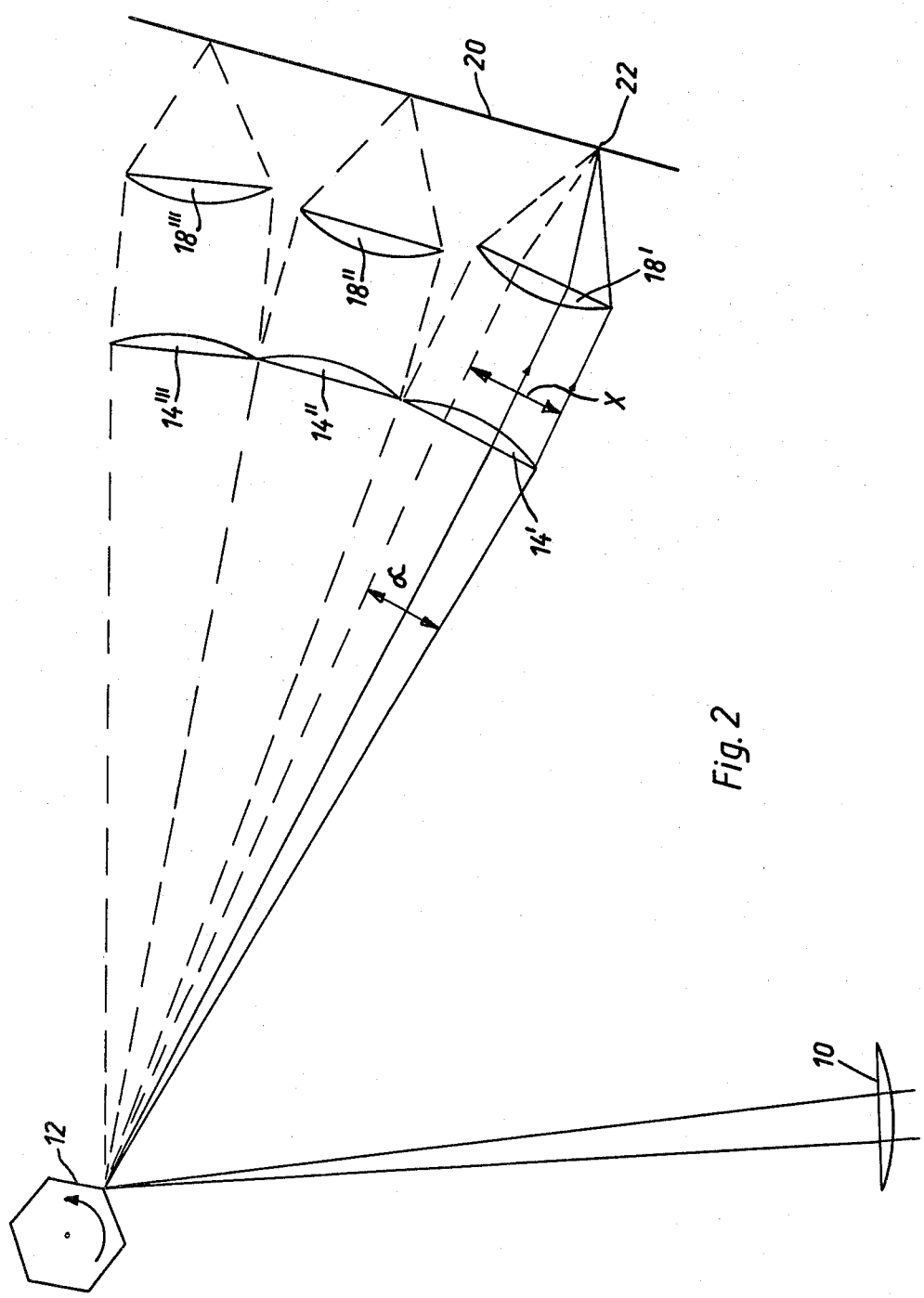

Further objects, features and advantages of the present invention will become apparent from a consideration of the following description, the appended claims and the accompanying drawing in which:

FIG. 1 is a schematic diagram in perspective showing the essential functional components of the device; and FIG. 2 is a schematic plan view of the beam path in the device.

According to FIG. 1, the beam originating from a laser 8 passes through a first collecting lens 10, the focus and line plane of which are located on a face of the rotating polygonal mirror 12 placed in the beam path behind the collecting lens 10. The polygonal mirror shown has six faces. The number of faces can be any desired one, however; for a given chopping frequency, it also depends on the speed of rotation that can be realized with the polygonal mirror.

During rotation of the polygonal mirror, the beam reflected by a face will sweep a certain angular interval; when the next face becomes effective, the beam jumps back and sweeps the same angular interval. This interval of the beam that is reflected by the rotating polygonal mirror contains a first lens system 14, consisting of three individual collecting lenses 14', 14'', 14'''. The collecting lenses all have the same focal length and such a position that their focus and their focal plane coincide with the focus and focal plane of the collecting lens 10 on the polygonal mirror. The light exiting lenses 14' to 14''' therefore has a parallel direction again.

In the practical version shown, the collecting lenses 10 and 14 are shown as cylindrical lenses. This has the advantage that the rotating mirror 12 is not under such a high load by the high energy density of the laser beam, since cylindrical lenses are known to form not a point, but a line in the focal plane. This advantage had to be realized at the expense of a higher precision in the positioning of the polygonal mirror, since any wobble defects of the mirror would naturally be of greater influence with the use of cylindrical than with spherical collecting lenses which image only one focus on the mirror.

The light beams exiting from the first lens system 14 are deflected by 90° by deflection mirror 16 in the example shown in FIG. 1. Such a deflection may be necessary for design reasons in certain applications. It is of secondary importance for the function of the device.

The deflection mirrors 16 are followed by a further lens system 18 consisting of individual spherical collecting lenses which focus the incident parallel beams on a paper web 20 located below and in the beam path behind lens system 18. The distance of lens system 18 from paper web 20 therefore corresponds to the focal length of the individual collecting lenses 18', 18'' and 18'''. The size of the individual lenses of system 18 should preferably correspond to the size of the individual lenses of system 14, so that each lens segment of lenses 14' to 14''' corresponds to a segment of lenses 18' to 18'''. This correspondence is clearly evident in FIG. 2 in which the deflecting mirrors between lens systems 14 and 18 have been omitted for greater clarity.

FIG. 2 shows sufficiently clearly that during a sweep of the angular interval α, the beam exiting from lens 14' is shifted in parallel direction by the amount X. The collecting lens 18' therefore must be of such a size that it will always focus the beam in focus 22 over the total distance of its parallel displacement X.

In the example shown, a continuous paper web 20 is being perforated with small holes located in rows transverse to the machine direction of the web. With a paper speed of e.g. 300 m/min and a required perforation spacing of 0.2 mm, the chopping frequency must amount to about 25 kHz. The chopping frequency can be adjusted almost as desired by the number of faces of the rotating polygonal mirror 12.

If the chopping frequency is increased or the web speed decreased until the holes overlap, the paper web 20 is not perforated, but instead is divided into several parallel webs. This practically results in "beam splitting" without the disadvantages customarily inherent in beam splitting, such as nonuniform and fluctuating intensity. In the present case, the total intensity of the original laser beam continues to be available.

What is claimed is:

1. Device for the optical chopping of a laser beam into discrete light impulses which sequentially and repeatedly are directed toward a number of target points, characterized by a collecting lens through which the laser beam passes, a rotating mirror whose reflecting surface lies in the focal plane of said collecting lens, a first system of several immediately adjacent collecting lenses arranged in a row, which are swept by the laser beam deflected by the rotating mirror and whose focal planes lie on the reflecting surface of the mirror and a second system of collecting lenses disposed between said first system of lenses and the target points, each lens of second system being respectively assigned a corresponding collecting lens of the first system and the focal planes of the lenses of said second system being on the target points.

2. Device according to claim 1, characterized in that the mirror is a polygon mirror.

3. Device according to claim 1 or 2, characterized in that the first-mentioned collecting lens and the lenses of said first system are cylindrical collecting lenses.

4. Device according to claim 1 or 2 characterized in that reflection mirrors are arranged between the first system of lenses and the second system of lenses.

5. Device according to claim 1 characterized in that the lenses of the second system are arranged in a row transverse to the transporting direction of a substrate, the substrate being disposed at the target points.

6. Device according to claim 5, characterized in that operation of said mirror is synchronized with the transport rate of the substrate and the lenses of said first and second systems are so arranged and constructed that the target areas lie in adjacent rows which are substantially transverse to the transport direction of the substrate.

7. Device according to claim 5 or 6, characterized in that the intensity of the laser beam is so chosen that the light impulses during the incidence on the substrate perforate the same.

8. A device for treating a substrate by means of a laser beam comprising a rotating mirror for reflecting a laser beam coming from a laser beam source through a system of focussing lenses arranged beside each other and whose focal planes are on the surface of a substrate to be treated, characterized in that between the laser beam source and the rotating mirror there is a first lens unit which focuses the laser beam on the rotating mirror and in that between the rotating mirror and said system of focussing lenses there is a further system of focussing lenses arranged beside each other and whose focal planes are also on the rotating mirror so that the first-mentioned system of focussing lenses is acted upon by parallel rays of light at a constant angle of incidence.

9. A device as in claim 8, characterized in that the first lens unit and the further system of focussing lenses comprise cylindrical focussing lenses.

10. A device as in claim 8 or 9, characterized in that deflection mirrors are arranged between the two systems of focussing lenses.

* * * * *